Feb. 18, 1941.   I. M. DILLER   2,232,169
COLORIMETER
Filed Aug. 6, 1938   3 Sheets-Sheet 1
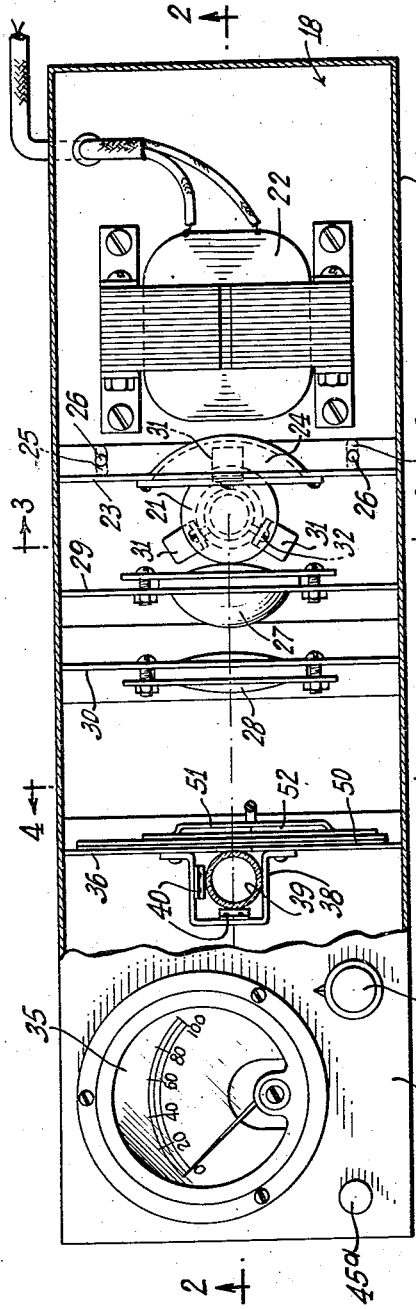
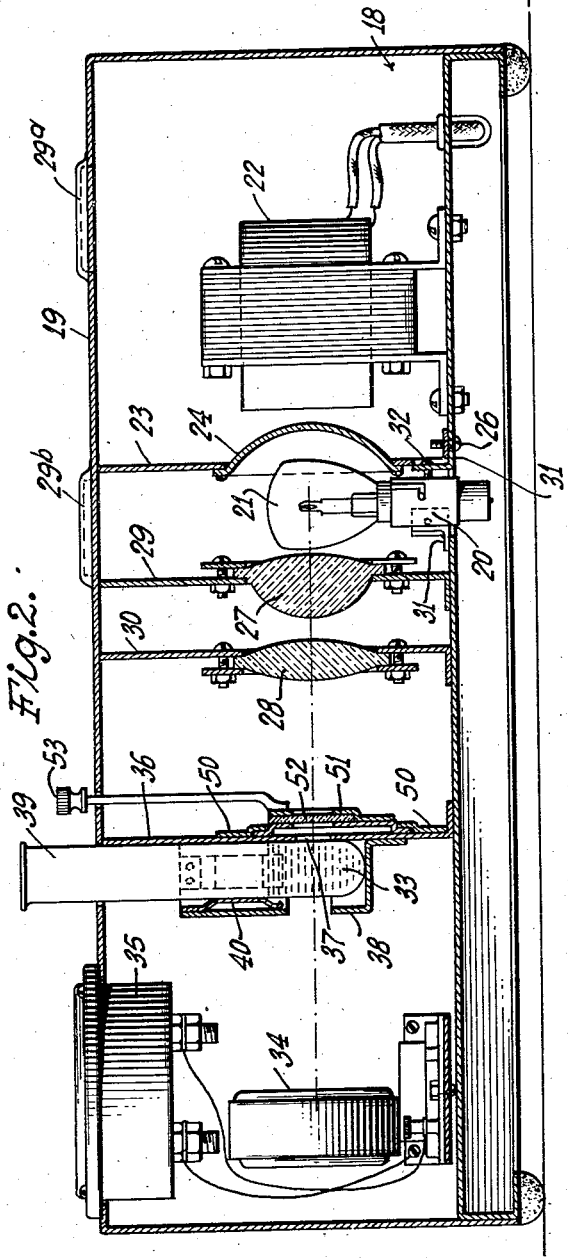
INVENTOR
Isaac M Diller
BY
ATTORNEY

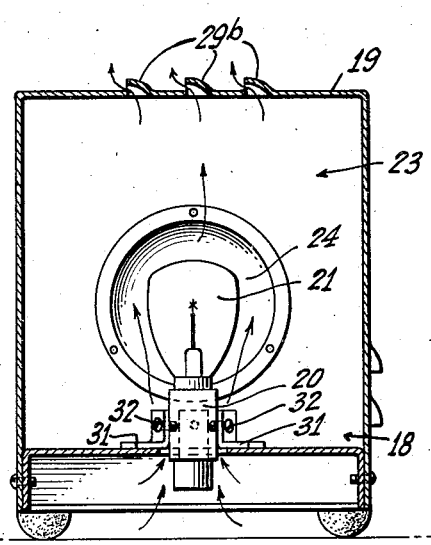
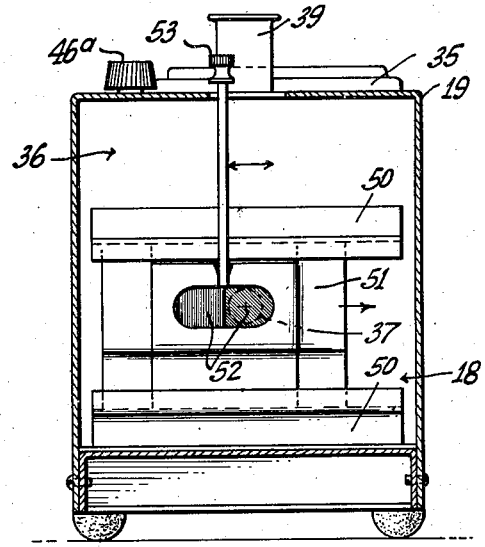
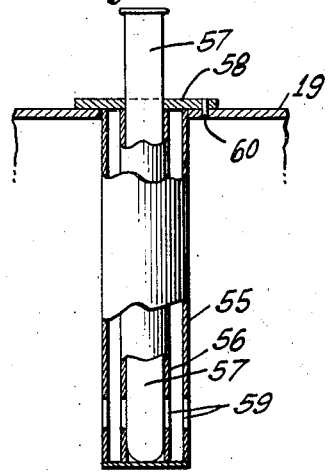
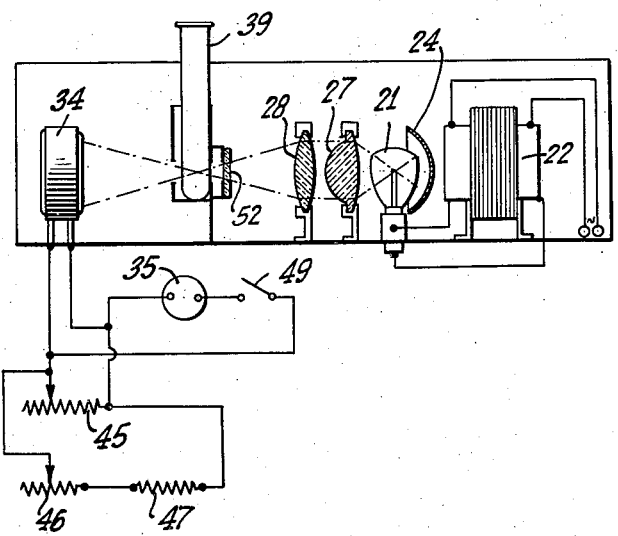
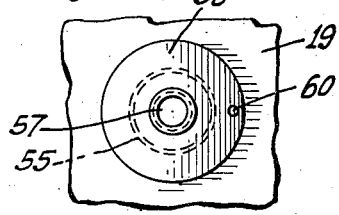

Feb. 18, 1941. I. M. DILLER 2,232,169
COLORIMETER
Filed Aug. 6, 1938 3 Sheets-Sheet 3
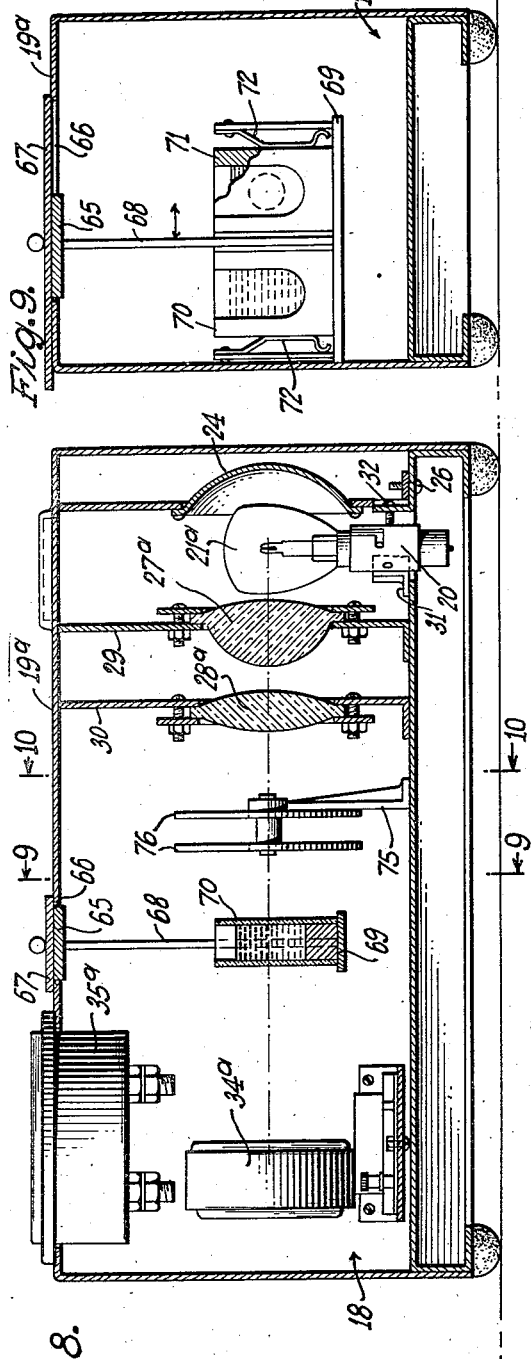
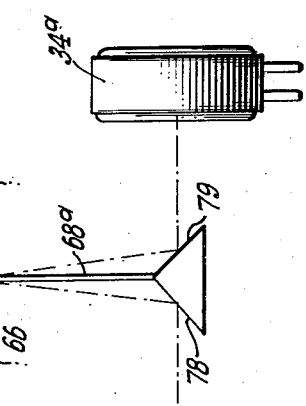
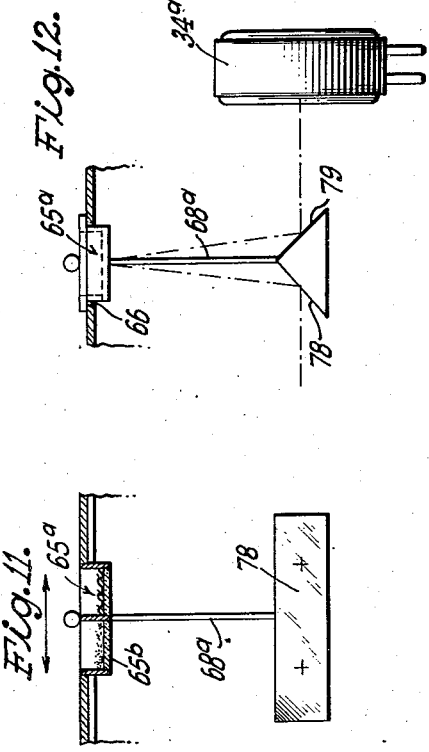
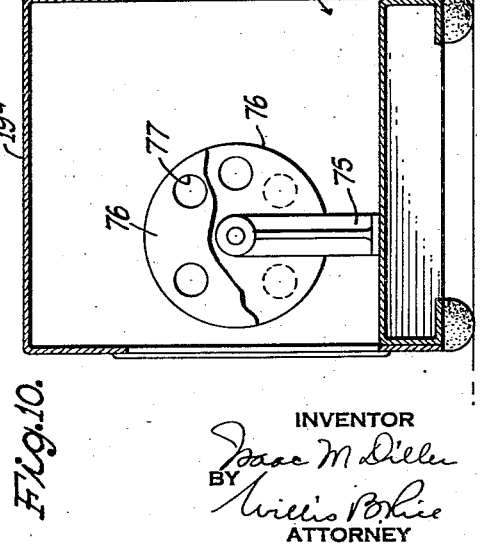
INVENTOR
Isaac M Diller
BY
Willis B Rice
ATTORNEY Patented Feb. 18, 1941

2,232,169

UNITED STATES PATENT OFFICE 2,232,169

COLORIMETER

Isaac M. Diller, Brooklyn, N. Y.

Application August 6, 1938, Serial No. 223,448

12 Claims. (Cl. 88—14)

This invention relates to colorimeters.

It is an object of this invention to provide a new and improved colorimeter in which the light passing through or reverted from the specimen is measured photometrically.

It is a further object of this invention to provide a device of the character described in which the light is brought to a focus at the point where it falls on the specimen so that the maximum sensitivity can be obtained.

It is a further object to provide a device in which the manipulation will be as simple as possible consistent with accuracy.

It is a further object to provide a device which can be used to afford a color analysis with a maximum of simplicity.

It is a further object to provide a device in which the comparison between the specimen and the standard may be made so simple that the results can be read directly in terms of light transmission without the necessity of calculation.

It is a further object to provide a device in which the internal parts may be examined with the greatest of ease without the necessity of disconnecting any of the parts or wiring.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Figure 1 is a top plan view of a device embodying this invention with a portion of the cover broken away.

Figure 2 is a center longitudinal section on the line 2—2 of Figure 1.

Figure 3 is a cross section on the line 3—3 of Figure 1.

Figure 4 is a cross section on the line 4—4 of Figure 1.

Figure 5 is a diagrammatic view showing the wiring connections.

Figures 6 and 7 are respectively an elevation partly in section and a top plan view of an adapter to enable small test tubes to be used.

Figure 8 is a center longitudinal section of a modified form of the device.

Figure 9 is a cross section on the line 9—9 of Figure 8.

Figure 10 is a cross section on the line 10—10 of Figure 8.

Figures 11 and 12 are respectively a front and side elevation of an adapter for use in testing by reflected light.

In the drawings the numeral 18 represents a container or casing having a cover 19 and having on its interior a socket 20 to receive the small electric bulb 21, such for example as the bulbs used in an automobile headlight. If such a bulb is used it is desirable to provide a transformer 22 for converting higher voltage to a voltage required by the lamp 21. The transformer is preferably situated in one end of the container 18 as shown, and is separated off from the remainder of the container by a partition 23.

In accordance with this invention means are provided for bringing the light rays from the source to a focus substantially at the point where the specimen is to be placed to diverge from that point to the photocell. Such focusing may be accomplished either by a parabolic or elliptical reflector or by a lens system. As here illustrated I prefer to employ a lens system coupled with a spherical mirror to direct backward directed rays into the initial focus of the lens system.

As shown the partition 23 carries a reflector 24 so constructed and arranged as to focus the light from the lamp 21 directly back upon the filament so as to keep it within the effective focus of the lens system to be described. To vary the position of the reflector the base of the partition 23 may be provided with slots 25 to receive screws 26.

The lamp 21 is arranged in the optical focus of a lens system, comprising a pair of lenses 27 and 28 which are mounted on partitions 29 and 30. The socket 20 is supported from the container in the manner to permit adjustment of the bulb 21 in all directions to place it in the exact focus of the optical system as shown. This adjustment is provided by three small brackets 31, each carrying a screw 32 to bear against the outside of the socket and hold it in place. By this means the position of the socket can be controlled by these screws.

By the construction thus described it will be seen that the partitions 23, 29 and 30 form three compartments within the container, one for the transformer 22 and one for the lamp 21 and one serving as an insulating compartment so that the heat generated by the transformer and lamp is kept away from the compartment hereafter to be described, containing the specimen and the photometric system. The compartments for the lamp and transformer are preferably provided with a ventilating system, as for example louvers 29a and 29b and by the arrangement shown ventilation is provided around the socket 20 by reason of the fact that the socket is of materially less diameter than the opening in the base to provide an air vent, the instrument being so constructed that air may enter below the base to pass up through this vent.

The remainder of the device consists primarily of means to support the specimen 33 in the optical focus of the lens system and a photometric system comprising, as shown, a photo-electric cell 34 coupled to a meter 35. A partition 36 is carried by the container substantially at the focus of the optical system, having a hole 37 to permit the focused light to pass therethrough. On the opposite side of the partition is a socket 38 adapted to receive a test tube or similar container 39. Springs 40 on the inner side of the socket are arranged to bear against the side of the test tube to hold it in a pre-determined position, preferably where it will be in the exact focal point. As shown the springs force the test tube over into one corner of the socket and at that point a standard size test tube will be in the focus. The cover 19 is provided with an opening through which the test tube can be inserted into the socket at will.

The cell 34 is situated far enough back of the specimen to permit the rays of light, diverging from the focal point, to spread over a substantial part of the surface of the cell, so that the entire surface may be used without a too intensive activity at any one point. I prefer to use the type of cell known as the barrier layer type, such for example as the Photronic cell of the Weston Electrical Instrument Co.

As will be seen from Figure 5, the cell 34 is connected directly to the meter 35 through a switch 49 and a resistance system is connected to regulate the response of the meter to the cell. For this purpose I prefer to provide a variable resistance 45 in shunt across the cell 34 and in shunt with the resistance 45 is a second variable resistance 46 in series with a fixed resistance 47. The resistances 46 and 47 are greater than the resistance 45 and the resistance 47 is greater than the resistance 46, so that the resistance 45 may be used to give a rough adjustment and the resistance 46 to give a fine adjustment to the reading of the meter.

With the construction shown, the resistances comprise a permanent shunt across the cell, which eliminates fatigue of the cell.

As will be seen from Figure 2, the meter 35 is carried by the cover 19 and the photo-electric cell and resistance units are also supported by the cover. It will be understood that the resistance units are controlled respectively by knobs 45a and 46a respectively, which also are carried by the cover. The other portions of the device, however, including the transformer, the lamp reflector and the condensers and preferably also the partition 36 are carried by the container so that as the cover of the container is lifted, the photometric device is removed as a unit and the partitions of the optical system are not disturbed.

It will be seen that with this arrangement I arrange for the passage of the maximum of light through the specimen and at the same time avoid fatiguing the photocell. It is thus possible to obtain a maximum sensitiveness even where the illumination is relatively feeble. This makes possible accurate readings even when the light utilized is limited to a narrow wave band, as for example by introducing between the light source and the photocell some color selecting means, such for example as a dispersing prism or color filters. I have chosen for illustration a device in which color filters or a combination of color filters are employed to enable the intensity of a particular color to be controlled.

As shown in these figures there is mounted on the partition 36 one or more slides 51 carrying one or more color filters 52. Thus, if it is desired to measure a change in the intensity of one color, this can be done even though that color be partly masked by some other color. The slide 51 may be moved from side to side in guides 50 by a rod, carrying a nut 53. If desired two such slides may be employed so that two different color filters may be used at once to narrow the wave band between them. Such a double filter may also be used to reduce the volume of light so that the reading may be amplified for a dark solution by removing one or more of the filters. Such filters may be arranged to absorb a fixed proportion of the light with or without color.

The bringing of the light to a focus at the specimen has another distinct advantage in that it makes it feasible to use a test tube of the ordinary cylindrical shape as a container for the specimen, and yet, by compensating or taking into account the refraction of the solution, nevertheless gather the emerging rays satisfactorily upon the photocell. For this purpose the area of the focused image at the focus should be small relative to the diameter of the test tube and the photocell will be placed where it will have the maximum effect.

The device as described is intended to receive a standard test tube. In some cases, as for example, where the sample to be tested is small it may be desirable to use a small test tube in order to get the available sample to rise higher in the test tube; for this purpose there is shown in Figures 6 and 7 an adapter suitable to accomplish this end. This device comprises a double wall tube, the outside of the outer wall 55 being the size of the standard test tube and the interior of the inner wall 56 being just of a size to receive the smaller test tube 57. This construction may be used as an attachment for the construction of Fig. 2 or the construction of Fig. 6 may be substituted for the construction of Fig. 2 insofar as the tube supporting device is concerned.

This adapter is arranged to be carried on a flange 58, resting upon the cover 19. Both of these walls 55 and 56 are pierced with openings 59 in alignment in the direction of passage of light within the instrument, and to keep the adapter in position to maintain this alignment there is provided a pin 60 upon the flange fitting within an opening in the top of the cover.

The form of the invention illustrated in Figures 8, 9 and 10 is in general similar to that previously described, having a bulb 21a, lenses 27a and 28a, a photo-electric cell 34a, a variable resistance system and a meter 35a. This embodiment is shown as intended to be used directly from a source of power and for this purpose no transformer is provided.

There is no need to describe again those parts which are identical in position and construction with the preceding embodiment. The specimen holder in this instance comprises a small horizontal block 65, fitting within a transverse slot 66 in the cover 19a, and having a flange 67 resting on top of the cover, the block being of such dimension that it can be slid to the right or left and the flange 67 being preferably of such dimension that it will maintain the slot 66 closed in all positions. A rod 68 depends from the block 65 carrying a table 69 adapted to support a pair of receptacles 70 and 71. Springs 72 are provided to force these receptacles into pre-determined or standard positions. The center lines of the receptacles 70 and 71 are spaced apart by an amount equal to the transverse travel of the block 65 in the opening 66, so that if the block is slid from one extreme position to the other one of the receptacles 70 or 71 is brought into the precise focus of the instrument.

In this embodiment there is shown a bracket 75 carrying discs 76 having a plurality of windows 77 each filled with a color filter and as illustrated two such discs 76 are provided so that a maximum number of color filter combinations may be used. It will be understood that these color filters are in alignment with the rays of light; if desired one or more of these windows may be used as a diaphragm to control the volume of light passing through the specimen, or one or more glasses may be used to absorb a fixed proportion of the light without color change to vary the scale reading of the instrument.

In Figures 11 and 12 there is provided a specimen holder which may be substituted for the specimen holder just described, adapted to test the reflected light of a specimen, as for example when it is desired to measure the color of an opaque powder. In this instance a block 65a is made in the form of a hollow container having a transparent underface 65b. A pair of reflectors 78 and 79 are carried on the lower end of a support rod 68a at an angle such that the reflector 79 will direct rays reflected downwardly by the material in the compartment 65a against photo-electric cell 34a. It will be understood that the compartment 65a will have the sample to be tested on one side of its center line and a comparison substance or a comparison reflecting surface on the other side so that the comparison between the material to be tested and the standard may be made by moving the compartment 65a from side to side as described. Thus it will be seen that the material within the compartment is subjected to a standard illumination and that the photo-electric cell will respond to the light reflected by the material under this standard illumination.

The manipulation of the apparatus will be evident from the foregoing description. Referring now to Figure 1, a test tube containing a standard solution is inserted in the socket 38 and the reading on the instrument 35 is noted. Thereafter the specimen to be tested is inserted in place of the comparison and the reading again noted. The ratio of these two readings will show color absorption in accordance with the well known principles.

If desired the instrument may be adjusted to read 100 when the comparison is being tested by adjusting the resistance upon the meter and when thereafter the specimen is inserted in place of the comparison we may get a direct percentage reading from the meter. I have found it practical to place upon the scale of the meter an inverted logarithmic scale, so that a direct reading may be obtained in terms of light absorption.

In the form of the invention described in Figure 8, the operation is substantially identical, except that the standard solution will be placed in the receptacle 71 and solution to be tested in the receptacle 70, these receptacles being of course accurately matched. In testing the samples the reading is made on one sample and then the block 65 is slid to the other side of the slot and the reading again taken.

By reason of the control resistances 45, 46 and 47, the reading may be brought to any desired value in testing the standard, and thereafter the reading on the specimen will bear a direct relation.

In either form of the device, by the use of the color filters, the instrument may be caused to respond to a narrow band only so that within limits a color analysis may be made according to any given color separation, if the other constants of the system be known. Moreover the instrument may be used to measure the change in one color when partly masked by the presence of another color; for instance in a solution normally yellow an increase in a reddish tone can be more readily detected by using a color filter which blocks out the masking color.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent, is:

1. A colorimeter comprising a light source, means for focusing the light from said source at a point, means for supporting a specimen to be tested in a stationary position directly in the path of the focused light substantially at said focus, a photoelectric cell in the path of the rays from said specimen and beyond said focus and a quantitative measuring instrument connected to be operated by said photocell.

2. A colorimeter comprising a light source, means for focusing the light from said source at a point, means for supporting a specimen to be tested directly in the path of the focused light substantially at said focus, a photometric device including a photocell in the path of the rays from said specimen and beyond said focus, whereby the light will strike said specimen substantially at the point of maximum concentration and will thereafter diverge to spread over the surface of said cell said specimen-supporting means including a frame, means for supporting said frame for lateral movement, fixed guides for determining the limits of said movement and means for definitely positioning said specimen and a comparison specimen on said frame at points corresponding to the two positions of movement, said lateral movement being such that the two specimens may be alternately positioned at the focal point of the optical system.

3. A device according to claim 1 in combination with means for supporting a color filter between the light focusing means and the photoelectric cell at a point remote from the focus.

4. A device according to claim 1 in which the specimen supporting means is adapted to support two specimens side by side and is so constructed and arranged as to permit the specimens to be moved to replace each other to bring one or the other into the focus as desired.

5. A colorimeter comprising a container, a source of light within said container, a photoelectric cell in the path of light from said source and within said container, an optical system for focusing light from said source at a point between said optical system and said cell, a transverse slot in the cover of said container opposite said point, a frame insertable and removable through said slot and constructed and arranged to support two specimens side by side, and so constructed and arranged as to permit the specimens to be slid from side to side to bring one or the other into the focal point as desired.

6. A device according to claim 1 having a high resistance and a low resistance in multiple with each other and with said measuring instrument, said low resistance being fully variable and means to limit the variability of said high resistance so that it may not be reduced below the resistance of said low resistance.

7. A device according to claim 5 having a meter connected to the photo-cell and a removable cover for the container and in which the optical system and source of light are attached to the container and the photo-electric cell and meter are carried by said cover.

8. A device according to claim 5 having a meter connected to the photo-cell and a variable resistance in shunt with said cell for varying the reading of the meter, a removable cover for the container, the optical system and the source of light being carried by said container and the photo-electric cell, the meter and the variable resistance being carried by the cover.

9. An adapter for colorimeters having a source of light and a photometric device in the path of said light, said adapter comprising a frame, a compartment for material to be tested at the top of said frame, a pair of reflectors carried by said frame, said frame being adapted to engage a portion of the colorimeter to support one of said reflectors in the path of light, said reflector being constructed and arranged to reflect the light onto said material and the other of said reflectors being constructed and arranged to reflect light from said material to the photometric device.

10. A colorimeter comprising a source of light, a photo cell in the path of the rays of light from said source, means for bringing the rays to a focus at a point between the source and the photo cell and means to support a light transmitting specimen to intercept the rays of light at said focus, whereby said photo cell responds to the rays of light which have passed through said specimen after they have diverged from said focus, said specimen supporting means comprising means for removably holding a test tube in stationary position with its lower portion substantially at said focus.

11. A colorimeter comprising a source of light, a photo cell in the path of the rays of light from said source, means for bringing the rays to a focus at a point between the source and the photo cell, means to support a light transmitting specimen to intercept the rays of light at said focus, whereby the photocell responds only to the rays of light which have passed through said specimen after they have diverged from said focus, said specimen support comprising a partition having a central opening for the passage of the light and a socket upon said partition below said opening to receive a test tube and support the bottom of the same below said opening, means to clamp the body of the test tube firmly against said opening and in accurate registry therewith, said opening being of less width than said test tube.

12. A colorimeter according to claim 10 in which the means for supporting the test tube comprises an opaque element having a central opening for the passage of the light, a socket upon said element below said opening to receive a test tube and support the bottom of the same below said opening and with the lower portion of the test tube in alignment therewith, said opening being of a size to confine the light at least to the width of the test tube.

ISAAC M. DILLER.